United States Patent [19]
Kent

[11] 3,730,627
[45] May 1, 1973

[54] SIGNAL PROCESSOR
[75] Inventor: Robert L. Kent, Andover, Mass.
[73] Assignee: Damon Corporation, Needham Heights, Mass.
[22] Filed: Sept. 22, 1971
[21] Appl. No.: 182,785

[52] U.S. Cl..................................356/205, 356/93
[51] Int. Cl..............................................G01n 21/22
[58] Field of Search......................356/88, 89, 93–97, 356/201, 204–206, 211, 212

[56] References Cited

UNITED STATES PATENTS

| | | | |
|---|---|---|---|
| 3,071,037 | 1/1963 | Brumley | 356/94 |
| 3,547,542 | 12/1970 | Bulpitt et al. | 356/88 X |
| 2,722,156 | 11/1955 | Warren | 356/206 |
| 2,803,752 | 8/1957 | Warren | 356/206 X |

*Primary Examiner*—Ronald L. Wibert
*Assistant Examiner*—F. L. Evans
*Attorney*—Herbert W. Kenway et al.

[57] ABSTRACT

The absorbance measuring signal processor disclosed herein operates to generate a signal representing the absorbance of an unknown sample in relation to the absorbance of a previously measured standard sample. In measuring the absorbance of each sample, standard or unknown, the apparatus generates a signal corresponding to the log ratio of two signals, representing, respectively, the optical transmission of the sample channel and the optical transmission of a reference channel. The use of the ratio of the two transmission characteristics compensates for source and detector sensitivity variations while the logarithmic characteristic provides a signal which corresponds with the absorption characteristic.

In accordance with the invention, a controlled attenuation factor is applied to one of the transmission signals and this attenuation factor is adjusted, during measurement of the standard sample, so as to produce an absorbance output signal of predetermined level. A signal level representing this particular attenuation factor is sampled and stored and this same attenuation factor is then applied during the measurement of subsequent unknown samples. Accordingly, the absorbance-representing output signals obtained with unknown samples vary in relation to the predetermined standard absorbance output signal level as their absorbances vary in relation to the absorbance of the standard sample.

6 Claims, 1 Drawing Figure

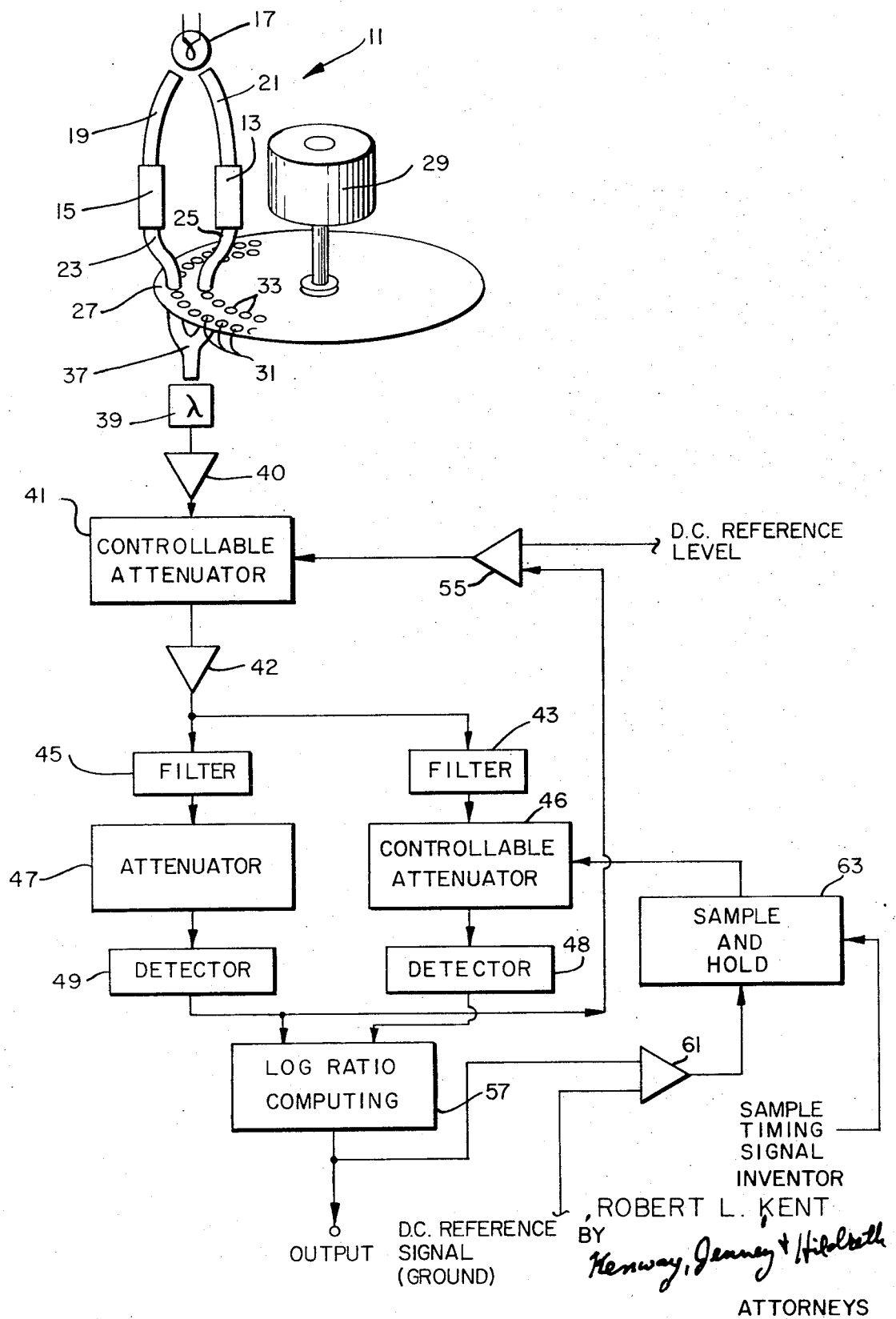

SIGNAL PROCESSOR

BACKGROUND OF THE INVENTION

This invention relates to a signal processor for an absorbance measuring system and more particularly to such a processor which utilizes a stored attenuation factor so as to optimally utilize the available dynamic range of a log ratio signal generator.

In the colorimetric analysis of various substances, e.g. blood, so as to obtain a measure of the quantity of a particular constituent thereof, the optical absorbance of the constituent, or a reaction product derived from the constituent, is typically measured by means of a dual beam colorimeter. In such colorimeters, it is customary to obtain a signal representing absorbance by computing the log ratio of a pair of electrical signals representing the optical transmission characteristics of a sample channel and a reference channel. The use of ratio measurement causes variations in light source output and detector sensitivity to be cancelled and the logarithmic characteristic causes the output signal to be representative of absorbance rather than transmission. The typical log ratio computing circuitry employed utilizes both time gating and amplitude sensing techniques and has a limited dynamic range. The transmission signals typically encountered, on the other hand, may often vary over a quite substantial dynamic range due both to optical variations and to variations in the chemistries which may be used. While the use of an a.g.c. system of conventional design can substantially reduce the dynamic range required, further improvement is desirable in that it can correspondingly increase the accuracy of the final measurement obtained.

The present invention makes use of the fact that, in most determinations, the absorbances of almost all samples typically encountered will be greater than some determinable level, which level is significantly different from the absorbance of the optical reference channel. Thus, there is no need to provide log ratio computing capability covering the range below this determinable lever. In the practice of the present invention, a specially prepared standard sample is utilized to define the lower limit of absorbance and this level absorbance is used to define or predetermine one end of the dynamic range of the log ratio computing circuitry.

Among the several objects of the present invention may be noted the provision of signal processing apparatus for an absorbance measuring system providing improved accuracy; the provision of such processing apparatus which employs log ratio computing circuitry; the provision of such apparatus which optimally utilizes the dynamic range of the log ratio signal computing circuitry; the provision of such apparatus which is highly accurate and which is of relatively simple and inexpensive construction. Other objects and features will be in part apparent and in part pointed out hereinafter.

SUMMARY OF THE INVENTION

Briefly, apparatus according to the present invention is adapted for use in an absorbance measuring system in which the transmission of a sample channel is compared with the transmission of a reference channel, signals representing t-he respective transmission characteristics being generated. One of the transmission signals is attenuated by a factor which is variable by means of a control signal. An output signal is generated which varies as a function of the ratio of the attenuated transmission signal and the other transmission signal. A control means is provided which is operative in a first state to generate and apply to the attenuating means a control signal having an amplitude which varies as a function of the output signal thereby to form a feedback loop which adjusts the output signal to a predetermined level. In a second state, the control means operates to store and continue to apply, to the attenuating means, a control signal at the previously existing level. The overall system is operated in a sequence in which the control means is operated in its first state during the measuring of a reference sample and is switched to the second state to store the corresponding control signal level. The control signal generating means is then left in that second state during the subsequent measurement of unknown samples. Accordingly, the output signal varies in relation to the predetermined level in correspondence with the relation of the absorbance of subsequent unknown samples to the absorbance of the previously measured standard sample.

BRIEF DESCRIPTION OF THE DRAWING

The single drawing is a somewhat schematic block diagram of photometric apparatus employing signal processing apparatus according to the present invention.

DESCRIPTION OF THE PREFERRED EMBODIMENT

Referring now to the drawing, a comparison or dual beam colorimeter 11 is illustrated in very diagrammatic form. A more complete disclosure of a colorimeter of this type is contained in the commonly assigned and copending application of Lawrence C. Bonar, Leo Blumley and Andres Ferrari for Multiple Photometer Assembly, Ser. No. 105,822, filed Jan. 12, 1971. Colorimeter 11 is adapted for use in the colorimetric analysis of fluids, e.g. blood, and comprises a sample cell 13 and a reference cell 15. Each of the cells preferably includes means (not shown) for admitting a sample liquid or a reference liquid, e.g. an unreacted sample aliquot. The embodiment illustrated was designed for incorporation in an automatic blood analysis system of the type disclosed in the commonly assigned and copending application of David I. Kosowsky and Andres Ferrari for Constituents-Measuring Chemical Analyzer Having Multiple Concurrently-Operated Aliquot-Processing Conveyors, Ser. No. 105,805, filed Jan. 12, 1971.

Radiation from a common source 17 is applied to the cells 13 and 15 through respective light pipes 19 and 21. While the radiation employed is described as light in the specification for simplification of the explanation, it should be understood that ultraviolet or infrared radiation may be used as well as visible light. Light transmitted through each of the cells 13 and 15 is coupled, through respective light pipes 23 and 25, to one face of an optical chopping disc 27.

Disc 27 is rotated at a predetermined angular velocity by a motor 29 and is perforated, in conventional manner, so as to provide a first circular array of apertures 31 and a second, concentric, circular array of apertures 33. The light pipe 23 is positioned so that the optical signal carried thereby is chopped by the apertures 31 while the light pipe 25 is positioned so that its optical signal is chopped by the apertures 33. The two circular arrays comprise different numbers of apertures so that the different chopping rates are applied to the two optical channels. In the embodiment illustrated, the number of apertures were selected, in relation to the speed of the motor 29, so that the reference cell light path was chopped at a frequency of 390 Hz, and the sample cell light path was chopped at a rate of 690 Hz. The chopped light signals thereby provided on the opposite face of the disc 27 are combined in a light pipe wye 37, and the combined radiation is applied to a detector 39. The use of a common detector is preferred in that errors due to mis-matching of detectors are avoided.

The signal obtained from detector 39, representing a.c. components from both optical channels, is applied to a preamplifier 40 and then to a controllable attenuator 41. A preferred form of attenuator comprises a field-effect transistor operated in a linear resistance mode as understood by those skilled in the art. As is explained in greater detail hereinafter, attenuator 41 is employed in providing an a.g.c. (automatic gain control) action which is responsive to the reference channel signal but affects the gain of both the reference and the sample channels.

The attenuated a.c. signal is buffered by means of an amplifier 42 and is applied to a pair of tuned filters 43 and 45, each filter being tuned to a respective one of the optical chopping frequencies. The filters 43 and 45 operate to separate the two signals which were previously combined optically so that they could be received up by a common detector, the filter 43 being responsive to the sample channel signal and the filter 45 being responsive to the reference channel signal. The sample channel signal, in a.c. form as obtained from the filter 43, is applied to a second controllable attenuator 46. As is also explained hereinafter, it is this controllable attenuator which is employed in optimally utilizing the dynamic range of the overall signal processing circuitry. In order to maintain appropriate signal levels, the reference channel signal is preferably also attenuated, though to a fixed degree, as indicated at 47. The separated and respectively attenuated a.c. signals are then applied to respective rectifiers or detectors 48 and 49 to obtain proportional d.c. voltages. As will be understood by those skilled in the art, the d.c. signal or voltage obtained from each of the detectors will be essentially proportional to the transmittance of the respective sample or reference cell. These d.c. signals thus represent the quantities of which it is desired to obtain the log ratio.

The d.c. signal obtained from the detector 49, representing the reference channel optical transmittance, is compared, in a differential amplifier 55, with a predetermined d.c. reference voltage. The output signal from amplifier 55 is thus an amplified difference or error signal and is applied as a control signal to the controllable attenuator 41. As may be seen, a feedback loop is thereby formed which adjusts the attenuation provided by attenuator 41 so as to maintain he reference channel at a level substantially equal to the d.c. reference voltage. In other words, an a.g.c. action is provided. Since this a.g.c. action operates on the combined transmission signals, i.e. before separation by filtering, it can be seen that variations in both signals, due to source or detector variations, are correspondingly compensated for.

The d.c. signals representing the transmissions of the two optical channels are applied to a log ratio computing circuit 57. Computing circuit 57 is preferably of the type described in the coassigned, copending application of Rosario S. Badessa for Log Ratio Signal Processor, Ser. No. 105,802, filed Jan. 12, 1971. This circuit operates to generate an output signal voltage which is proportional to the logarithm of the ratio of the two input voltages. In the embodiment illustrated, it is assumed that the log ratio computing circuit 57 is arranged so that the output voltage is at ground when the input signals are equal and becomes more positive when the sample channel voltage decreases indicating more absorbance due to an increased amount of the sample constituent being measured. This output signal thus varies in accordance with the logarithmic nature of absorbance measurement and may be taken as a measure of absorbance.

If both of the transmittance signals were subjected to exactly the same attenuation at each stage of the signal processing, it can be seen that the absorbance measured or represented by the output signal would be the additional absorbance present in the sample cell as compared with the reference cell. However, as indicated previously, a portion of the limited available dynamic range of the log ratio computing circuit 57 would not be usefully employed with such an arrangement. In accordance with the practice of the present invention, the attenuator 46 is controlled so as to cause one end point or limit of the dynamic range of the computing circuit 57 to be coincident with the value of absorbance produced by a standard sample submitted to the measuring apparatus.

The output signal from the log ratio computing circuit 57 is compared, in a differential amplifier 61, with a predetermined d.c. reference level. This reference level is selected so as to be equal to that output signal level which is desired when a standard sample having a known or predetermined concentration of the constituent is being measured. In the embodiment illustrated, this reference level is assumed to be ground potential which is equal to or coincident with one end of the dynamic range of the log ratio computing circuitry 57. The output signal from amplifier 61, which comprises an amplified error or difference signal, is applied to a sample-and-hold circuit 63 and the signal level sampled and/or held by the circuit 63 is applied to the attenuator 46 as its control signal.

During the processing of a standard sample, the circuit 63 is initially operated in its sample mode so that its output signal, the attenuator control signal, varies as a function of the error signal. Since the variable attenuator 46 affects the amplitude of only one of the two input signals to the log ratio computing circuit 57 and is controlled, in this mode, as a function of the computing circuit output voltage, it can be seen that a feedback loop is formed which tends to adjust the output voltage of the computing circuit to a level equal to the d.c. reference level, i.e. ground. Thus, at this point in the operation of the system, the attenuation factor in the sample channel signal path is empirically set so as to produce a desired or predetermined output signal voltage. While the attenuator 46 is thus appropriately adjusted, the sample-and-hold circuit 63 is switched into its hold or storing mode so that the control signal level which produces this value of attenuation is stored and maintained. The sample-and-hold circuit is then left in this condition during the measurement of subsequent unknown samples.

Assuming that the subsequent unknown samples produce greater absorbances than the standard sample, it can be seen that the output signal provided by the log ratio computing circuit 57 will comprise a measure of the absorbance of these subsequent unknown samples relative to the absorbance of the standard sample. This then is in contrast to providing a measure of absorbance relative to the absorbance of the blank or reference cell. Accordingly, the full available dynamic range of the log ratio computing circuit 57 can be utilized for precisely resolving the absorption range within which the expected majority of samples being analyzed will fall.

As indicated previously, the signal processing apparatus of the present invention will typically comprise a portion of a larger, overall automatic analysis apparatus and the timing signal which controls the switching of the sample-and-hold circuit 63 between its sampling mode and its holding mode will typically be provided by the sequencer or programmer which controls the overall sequence of operations performed by the analyzer.

As will be understood, the operation of the feedback loop which controls the attenuator 46 in the sample channel signal path cooperates with and is facilitated by the operation of the interlocking a.g.c. feedback loop which controls the variable attenuator 51 so as to compensate for variations or fluctuations in source intensity or detector sensitivity. Accordingly, the amplitude of one of the two input signals initially applied to the log ratio computing circuit 57 is maintained substantially at a predetermined level, thereby facilitating the operation of the range control circuitry of the present invention.

In view of the foregoing, it may be seen that several objects of the present invention are achieved and other advantages results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. In an absorbance measuring system in which the transmission of a sample channel is compared with the transmission of a reference channel and signals representing the respective transmission characteristics are generated; apparatus for providing a signal representing the absorbance of an unknown sample as compared with the absorbance of a standard sample, said apparatus comprising:
means for attenuating one of said transmission signals by a factor which is variable as a function of the amplitude of a control signal applied thereto;
means for generating an output signal which varies as a function of the ratio of the attenuated transmission signal and the other transmission signal;
means operative in a first state to generate and apply to said attenuating means a control signal having an amplitude which varies as a function of said output signal thereby forming a feedback loop which adjusts said output signal to a predetermined level and operative in a second state to store and continue to apply to said attenuating means a control signal at the existing control signal amplitude level, the system being operated in a sequence in which said control signal applying means is in said first state during measuring of a standard sample, is switched to said second state to store the control signal amplitude level produced in response to said standard sample, and is left in said second state during the subsequent measurement of unknown samples whereby the output signal varies in relation to said predetermined level as a function of the relation of the absorptions of subsequent unknown samples to the absorption of the previous standard sample.

2. In an absorbance measuring system in which the transmission of a sample channel is compared with the transmission of a reference channel and signals representing the respective transmission characteristics are generated; apparatus for providing a signal representing the absorbance of an unknown sample as compared with the absorbance of a standard sample, said apparatus comprising:
means for attenuating the sample channel transmission signal by a factor which is variable as a function of the amplitude of a control signal applied thereto;
means for generating an output signal which varies as a function of the logarithm of the ratio of the reference channel transmission signal to the attenuated sample channel transmission signal;
a sample and hold circuit for selectively sampling said output signal and, during sampling, applying to said attenuating means a control signal having an amplitude which varies as a function of said output signal, thereby to form a feedback loop which adjusts said output signal to a predetermined level, said sample and hold circuit being selectively operative to store and continue to apply to said attenuating means a control signal at the existing control signal amplitude level, the system being operated in a sequence in which said sample and hold circuit, samples during measuring of a standard sample, stores the control signal amplitude level thereby produced in response to said standard sample, and holds said control signal amplitude level during the subsequent measurement of unknown samples whereby the output signal varies in relation to said predetermined level as a function of the relation of the absorptions of subsequent unknown samples to the absorption of the standard sample.

3. Apparatus as set forth in claim 2 wherein said predetermined level is coincident with one end of the range of said log ratio output signal generating circuit.

4. Apparatus as set forth in claim 2 including circuit means providing automatic gain control action maintaining the reference channel transmission signal applied to said log ratio output signal generating means at a substantially predetermined level.

5. In an absorbance measuring system in which the transmission of a sample channel is compared with the transmission of a reference channel and signals representing the respective transmission characteristics are generated; apparatus for providing a signal representing the absorbance of an unknown sample as compared with the absorbance of a standard sample, said apparatus comprising:

means for attenuating both transmission signals by a factor which is variable as a function of a first control signal;

means for generating and applying to said attenuating means as said first control signal, a signal which varies as a function of the amplitude of the attenuated reference channel transmission signal relative a predetermined voltage level thereby to maintain said attenuated reference channel transmission signal substantially at said predetermined voltage level;

means for attenuating the sample channel transmission signals by a factor which is variable as a function of the amplitude of a second control signal;

means for generating an output signal which varies as a function of the logarithm of the ratio of the attenuated sample transmission signal and the attenuated reference transmission signal;

sample and hold means operative in a first state to generate and apply to said sample channel attenuating means as said second control signal a signal having an amplitude which varies as a function of the amplitude of said output signal relative a second predetermined voltage level thereby forming a feedback loop which adjusts said output signal to said second predetermined voltage level and operative in a second state to store and continue to apply to said sample channel attenuating means a signal at the existing level, the system being operated in a sequence in which said sample and hold means is in said first state during measuring of a standard sample, is switched to said second state to store the second control signal amplitude level produced in response to said standard sample, and is left in said second state during the subsequent measurement of unknown samples whereby the output signal varies in relation to said second predetermined voltage level as a function of the relation of the absorptions of subsequent unknown samples to the absorption of the previous standard sample.

6. In an absorbance measuring system in which the optical transmission of a sample channel is compared with the optical transmission of a reference channel said channels being chopped at different frequencies and being combined for detection by a common detector; apparatus for providing a signal representing the absorbance of an unknown sample as compared with the absorbance of a standard sample, said apparatus comprising:

means for attenuating a signal obtained from the detector by a factor which is variable as a function of a first control signal;

detector means for obtaining, from said attenuated detector signal, a sample channel transmission signal and a reference channel transmission signal;

means for generating and applying to said attenuating means as said first control signal, a signal which varies as a function of the amplitude of said reference channel transmission signal relative a predetermined voltage level, thereby to maintain said reference channel transmission signal substantially at said predetermined voltage level;

means for attenuating said sample channel transmission signal by a factor which is variable as a function of the amplitude of a second control signal;

means for generating an output signal which varies as a function of the logarithm of the ratio of the attenuated sample transmission signal and said reference transmission signal; sample and hold means operative in a first state to generate and apply to said sample channel attenuating means as said second control signal a signal having an amplitude which varies as a function of the amplitude of said output signal relative a second predetermined voltage level thereby forming a feedback loop which adjusts said output signal to said second predetermined voltage level and operative in a second state to store and continue to apply to said sample channel attenuating means a signal at the existing level, the system being operated in a sequence in which said sample and hold means is in said first state during measuring of a standard sample, is switched to said second state to store the second control signal amplitude level produced in response to said standard sample, and is left in said second state during the subsequent measurement of unknown samples whereby the output signal varies in relation to said second predetermined voltage level as a function of the relation of the absorptions of subsequent unknown samples to the absorption of the previous standard sample.

* * * * *